United States Patent
Champion et al.

(10) Patent No.: US 9,195,261 B2
(45) Date of Patent: Nov. 24, 2015

(54) SYNCHRONIZING DATA FROM DIFFERENT CLOCK DOMAINS BY BRIDGES ONE OF THE CLOCK SIGNALS TO APPEAR TO RUN AN INTEGER OF CYCLES MORE THAN THE OTHER CLOCK SIGNAL

(71) Applicant: Teradyne, Inc., North Reading, MA (US)

(72) Inventors: Corbin L. Champion, Tigard, OR (US); John R. Pane, Tigard, OR (US)

(73) Assignee: Teradyne, Inc., North Reading, MA (US)

( * ) Notice: Subject to any disclaimer, the term of this patent is extended or adjusted under 35 U.S.C. 154(b) by 345 days.

(21) Appl. No.: 14/016,819

(22) Filed: Sep. 3, 2013

(65) Prior Publication Data

US 2015/0067382 A1     Mar. 5, 2015

(51) Int. Cl.
*G06F 3/00* (2006.01)
*G06F 1/12* (2006.01)
*H04L 7/00* (2006.01)

(52) U.S. Cl.
CPC ... *G06F 1/12* (2013.01); *H04L 7/00* (2013.01)

(58) Field of Classification Search
CPC .................................................. G06F 1/12
See application file for complete search history.

(56) References Cited

U.S. PATENT DOCUMENTS

| 5,883,905 A | 3/1999 | Eastburn | |
|---|---|---|---|
| 8,269,520 B2 | 9/2012 | Conner | |
| 2009/0265597 A1* | 10/2009 | Suda | G01R 31/31932 714/738 |

* cited by examiner

*Primary Examiner* — Tammara Peyton
(74) *Attorney, Agent, or Firm* — Fish & Richardson P.C.

(57) ABSTRACT

An apparatus may include: first circuitry configured to operate at a first frequency; second circuitry configured to operate at a second frequency that is different from the first frequency, where the second circuitry is for receiving input from, and for providing output to, the first circuitry; and logic that bridges the first circuitry and the second circuitry. The logic to enables the second circuitry to appear to run an integer number of cycles of the first frequency, and operates by receiving first signals at the first frequency and generating second signals at the second frequency, where the second signals are for triggering operations performed by the second circuitry. The apparatus may also include an output buffer circuit bridging the first circuitry and the second circuitry.

32 Claims, 4 Drawing Sheets

SYNCHRONIZING DATA FROM DIFFERENT CLOCK DOMAINS BY BRIDGES ONE OF THE CLOCK SIGNALS TO APPEAR TO RUN AN INTEGER OF CYCLES MORE THAN THE OTHER CLOCK SIGNAL

TECHNICAL FIELD

This specification relates generally to synchronizing data from different (e.g., asynchronous) clock domains.

BACKGROUND

Circuitry, such as automatic test equipment (ATE), may operate using different clock domains. For example, circuits implemented in a field-programmable gate array (FPGA) may operate at a slower clock frequency than circuits implemented using other technology. In another example, logic that is computationally intensive, such as a microprocessor, may not be able to run as fast as a system pipeline clock. Timing problems can result if slower-frequency circuits are incorporated into a pipeline with higher-frequency circuits, particularly if the two frequencies do not resolve (e.g., they are asynchronous).

SUMMARY

An example apparatus for synchronizing data between different clock domains comprises: first circuitry configured to operate at a first frequency; second circuitry configured to operate at a second frequency that is different from the first frequency, where the second circuitry is for receiving input from, and for providing output to, the first circuitry; and logic that bridges the first circuitry and the second circuitry. The logic is to enable the second circuitry to appear to run an integer number of cycles of the first frequency, and performs operations that include receiving first signals at the first frequency and generating second signals at the second frequency, where the second signals are for triggering operations performed by the second circuitry. The example apparatus comprises a buffer circuit bridging the first circuitry and the second circuitry. The buffer circuit comprises a first-in first-out circuit comprising an input terminal to receive data from the second circuitry in accordance with a second signal output by the logic and the second frequency and an output terminal to output the data in accordance with a first signal and the first frequency. The example apparatus may include one or more of the following features, either alone or in combination.

The logic may comprise a counter comprising: an up-counter circuit to count a number of the first signals; a pulse generator circuit to generate a pulse in response to reaching the number of the first signals, where the pulse has a width that exceeds a period of the second frequency; and an up-down-counter circuit to receive the pulse, to increment a count by the number, and to down-count from the number until reaching zero, where the down-counter outputs a second signal when the count is non-zero. The buffer circuit may be configured to output the data synchronously with the first frequency and an integer number of cycles behind an initially-received first signal at the logic.

The second circuitry may comprise: memory to store opcodes and operands at various addresses; and a processing device that is configured to operate at the second frequency and in accordance with an enable signal to identify an address of the memory and to output, to the buffer circuit, an address of the memory as the data. The buffer circuit may be configured to output the address synchronously with the enable signal at the first frequency. The first circuitry may comprise a delay element to receive the enable signal, to delay the enable signal a number of clock cycles, and to output the enable signal delayed to the buffer circuit. The processing device may comprise a sequencer for a pattern generator.

The second circuitry may comprise a processing device that is configured to operate at the second frequency and in accordance with an enable signal to output the data to the buffer circuit. The buffer circuit may be configured to output the address synchronously with the enable signal at the first frequency.

The buffer circuit may be a first buffer circuit and the apparatus may comprise a second buffer circuit bridging the first circuitry and the second circuitry, where the second buffer circuit comprises a first-in first-out circuit comprising an input terminal to receive data from the first circuitry at the first frequency and an output terminal to output the data to the processing device in accordance with a second signal output by the logic and the second frequency.

The first circuitry may comprise a delay element to receive the enable signal, to delay the enable signal a number of clock cycles, and to output the enable signal delayed to the first buffer circuit.

The apparatus may comprise a third buffer circuit bridging the first circuitry and the third circuitry, where the third buffer circuit comprises a first-in first-out circuit comprising an input terminal to receive the enable signal from the first circuitry at the first frequency and an output terminal to output the enable signal to the third circuitry in accordance with a second signal output by the logic and the second frequency. The apparatus may comprise a fourth buffer circuit bridging the first circuitry and the second circuitry, where the fourth buffer circuit comprises a first-in first-out circuit comprising an input terminal to receive a flag signal from the first circuitry at the first frequency and an output terminal to output the flag signal to the second circuitry in accordance with a second signal output by the logic and the second frequency.

The processing device may comprise a sequencer for a pattern generator. The first frequency may be greater than the second frequency. The second frequency may be greater than the first frequency. The first frequency and the second circuitry may be asynchronous.

The first circuitry and the second circuitry together may be part of automatic test equipment; and the second circuitry may comprise a pattern generator for use in the automatic test equipment.

Any two or more of the features described in this specification, including in this summary section, can be combined to form implementations not specifically described herein.

The apparatus described herein, or portions thereof, can be implemented as/controlled by a computer program product that includes instructions that are stored on one or more non-transitory machine-readable storage media, and that are executable on one or more processing devices to control (e.g., coordinate) the operations described herein. The apparatus described herein, or portions thereof, can be implemented as a system, a method, or an electronic system that can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Figure 1:
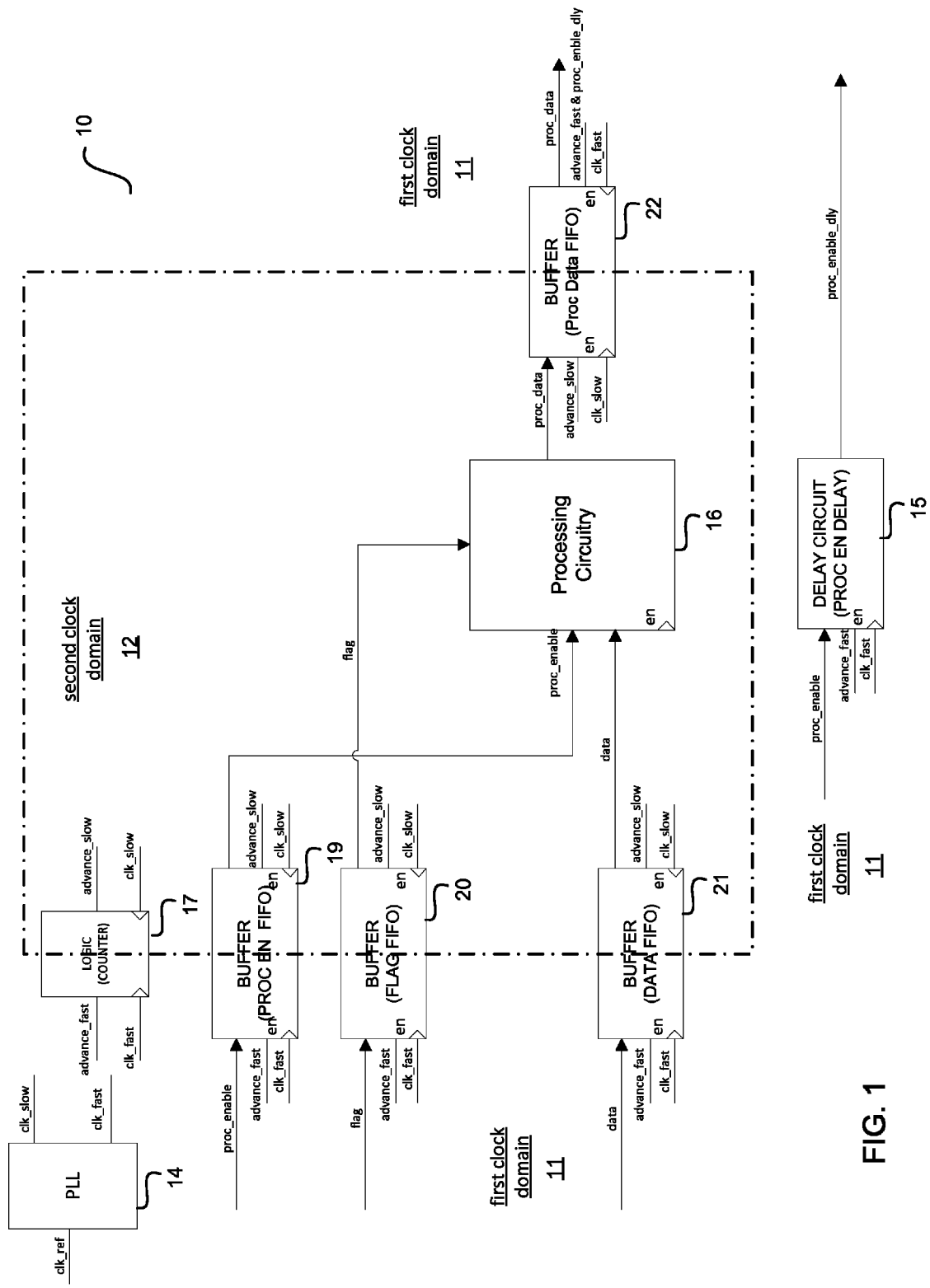
FIG. 1 is an example of circuitry in different clock domains.

FIG. 1 shows an example of a circuitry 10 that includes two clock domains that operate asynchronously. Circuitry 10 may be part of any type of apparatus or system, examples of which are provided below. Circuitry 10 may be, or include, logic elements and/or other types of circuitry.

Circuitry 10 includes a first clock domain 11 that operates at a first frequency, and a second clock domain 12 that operates at a second frequency. In this example implementation, the first frequency is higher than the second frequency; however, in other example implementations, the second frequency may be higher than the first frequency. Accordingly, the processes described herein may be used to translate from both low-to-high frequency clock domains and high-to-low frequency clock domains.

In example circuitry 10, the second clock domain is part of a pipeline within the first clock domain. In this example, second clock domain 12 receives input from the first clock domain 11, performs processing of that input, and generates an output back to the first clock domain. The clocks in the first and second domains do not resolve, meaning that the clock in the first domain does not run synchronously with the clock in the first domain. Accordingly, circuitry 10 includes features for synchronizing operation of the second clock domain to the first clock domain so that, from the perspective of the first clock domain, the operation of the second clock domain appears to occur within an integer number of cycles of the first clock domain. As a result, the output from the second clock domain to the first clock domain is synchronous with other circuitry operating in the first clock domain.

In example circuitry 10, first clock domain 11 operates at 400 MHz and second clock domain 12 operates at 275 MHz. However, in other implementations, the first and second clock domains may operate at frequencies that are different than these.

In example circuitry 10, first clock domain 11 includes phase-locked-loop (PLL) circuit 14 and delay circuit 15 (PROC EN DELAY). PLL 14 generates the clock signal for the first clock domain (clk_fast), which operates at 400 MHz, and the clock signal for the second clock domain (clk_slow), which operates at 275 MHz, from a reference clock frequency (clk_ref). In this example implementation, the reference clock frequency is 100 MHz; however, in other implementations, the reference clock frequency may have another value. Use of a common reference clock reduces the chances that the clock signals for the first and second clock domains will drift either closer together or farther apart.

Delay circuit 15 may include one or more buffers or other appropriate circuitry for delaying an input signal a number of cycles in the first clock domain. As noted above, from the perspective of first clock domain 11, the operation of second clock domain 12 appears to occur within an integer number of cycles of the first clock domain (even though, internally, the second clock domain operates asynchronously from the first clock domain). In some implementations, the number of cycles by which the input is delayed by delay circuit 15 corresponds to (e.g., is equivalent to or a multiple of) the integer number of cycles during which the circuitry in the second clock domain appears to operate. The inputs to, and outputs of, delay circuit 15 are described in more detail below.

In some implementations, second clock domain 12 includes processing circuitry 16, such as a sequencer or other type of processing device. Processing circuitry 16 operates at the second clock frequency (e.g., 275 MHz) to obtain data and to output the data to output interface circuitry to the first clock domain.

In some implementations, the interface circuitry between the first and second clock domains includes a counter 17 and one or more buffers 19 to 22. As described below, the input and output of each buffer are capable of operating at different clock frequencies corresponding to the first and second clock domains.

Counter 17 bridges the first and second clock domains. Counter 17 is configured to receive a number of signals at the first frequency and to generate signals for the second clock domain. These signals for the second clock domain are for triggering circuits within the second clock domain to perform operations. For example, the signals may be triggers to advance pipeline operations (e.g., movement of date, computations, and so forth) in the second clock domain.

In an example implementation, counter 17 includes an up-counter circuit, a pulse generator, and an up-down-counter circuit. The up-counter circuit may operate to count a number of signals (e.g., advance_fast) input from the first clock domain. The pulse generator circuit may generate a pulse in response to reaching a number of the signals (e.g., two such signals). The pulse may have a width that exceeds a period of the first clock so that it can be identified in the second clock domain. For example, the resulting pulse may be bigger than the period of the second clock. For example, the pulse may be two, three, four or more times the period of the clock signal for the second time domain.

The up-down-counter circuit may operate to receive the pulse, to increment a count (e.g., by two), and then to down-count from that initial count towards zero. During the down-count, the up-down-counter circuit may output, to the circuitry in the second clock domain, a signal (e.g., advance_slow) based the second clock signal (e.g., clk_slow). So, for example, if the up-counter receives two signals (e.g., advance_fast) from the first clock domain, the up-down-counter may output a corresponding signal (e.g., advance_slow) to the circuitry in the second clock domain so long as the count is non-zero, as described below. In other implementations, the counter may operate differently than this.

In some implementations, counter 17 includes a first counter that is only an up-counter. For example, every time a pipeline_advance signals is received in the first clock domain, the up-counter counts-up by one. In some implementations, every time a value of two is reached, the up-count is set to zero and a pulse is fired (e.g., by a pulse generator circuit) that is wide enough to be synchronized in the second clock domain. That pulse then passes through a one-shot circuit in the second clock domain, which may also be part of counter 17. The arrival of the one-shot pulse increments an up-down counter, which is also part of counter 17, by two. For every cycle that the count is non-zero, the up-down counter decrements the count by one. In this implementation, it is possible to achieve an increment and a decrement in the same cycle, in which case the result (in this example) would be a count of "count plus two minus one" or just "count plus one". This is described in more detail below with respect to FIG. 2.

In some implementations, counter 17 need not have the specific implementations described above, but rather may include any logic, such as that described above, that enables circuitry (e.g., logic) in the second clock domain to appear run an integer number of cycles of the clock for circuitry (e.g., logic) in the first clock domain.

In some implementations, buffer 22 (Proc Data FIFO) is a circuit that bridges the first clock domain and the second clock domain. Buffer 22 may include a first-in first-out (FIFO) circuit comprising an input terminal to receive data (e.g., proc_data) from circuitry (e.g., processing circuitry 16) in the second clock domain in accordance with a signal (e.g., advance_slow) output to the second clock domain by counter 17 and the second clock signal (e.g., clk_slow), and an output terminal to output the data (e.g., proc_data) in accordance with a signal (e.g., advance_fast & proc_enable_dly) received from circuitry in the first clock domain and the first clock signal (e.g., clk_fast). Generally, a FIFO circuit includes any type of circuit in which data is queued such that the first data to arrive in the buffer is the first data to exit the buffer, and subsequent data exits the buffer in the order that it arrived.

In an example implementation, buffer 21 (DATA FIFO) bridges the first clock domain 11 and the second clock domain. Buffer 21 may be a first-in first-out circuit comprising an input terminal to receive data (e.g., data) from the circuitry in the first clock domain in accordance with a signal (e.g., advance_fast) and the first clock signal (e.g., clk_fast) and an output terminal to output the data (e.g., data) to processing circuitry 16 (or any other appropriate circuitry in the second clock domain) in accordance with a signal (e.g., advance_slow) output by counter 17 and the second clock signal (e.g., clk_slow). The data received and output by buffer 21 may be any type of data that can pass through the second clock domain pipeline. In some implementations, the data may relate to testing, as described below.

In an example implementation, buffer 19 (PROC EN FIFO) bridges the first clock domain 11 and the second clock domain. Buffer 19 may be a first-in first-out circuit comprising an input terminal to receive an enable signal (e.g., proc_enable) from the circuitry in the first clock domain in accordance with a signal (e.g., advance_fast) and the first clock signal (e.g., clk_fast) and an output terminal to output the enable signal (e.g., proc_enable) to processing circuitry 16 (or any other appropriate circuitry in the second clock domain) in accordance with a signal (e.g., advance_slow) output by counter 17 and the second clock signal (e.g., clk_slow). In some examples, the enable signal (e.g., proc_enable) is a start signal, which enables operation of the circuitry to which it is applied.

In an example implementation, buffer 20 (FLAG FIFO) bridges the first clock domain 11 and the second clock domain. Buffer 20 may be a first-in first-out circuit comprising an input terminal to receive a flag signal (e.g., flag) from the circuitry in the first clock domain in accordance with a signal (e.g., advance_fast) and the first clock signal (e.g., clk_fast) and an output terminal to output the flag signal (e.g., flag) to processing circuitry 16 (or any other appropriate circuitry in the second clock domain) in accordance with a signal (e.g., advance_slow) output by counter 17 and the second clock signal (e.g., clk_slow). In some examples, the flag signal is a signal that reflects a condition, such as an error condition, a status, or other information, and may affect operation of the processing device.

In other implementations, there may be at least some additional and/or different circuitry bridging the first and second clock domains; at least some additional and/or different circuitry within the first clock domain; and/or at least some additional and/or different circuitry within the second clock domain.

Figure 2:
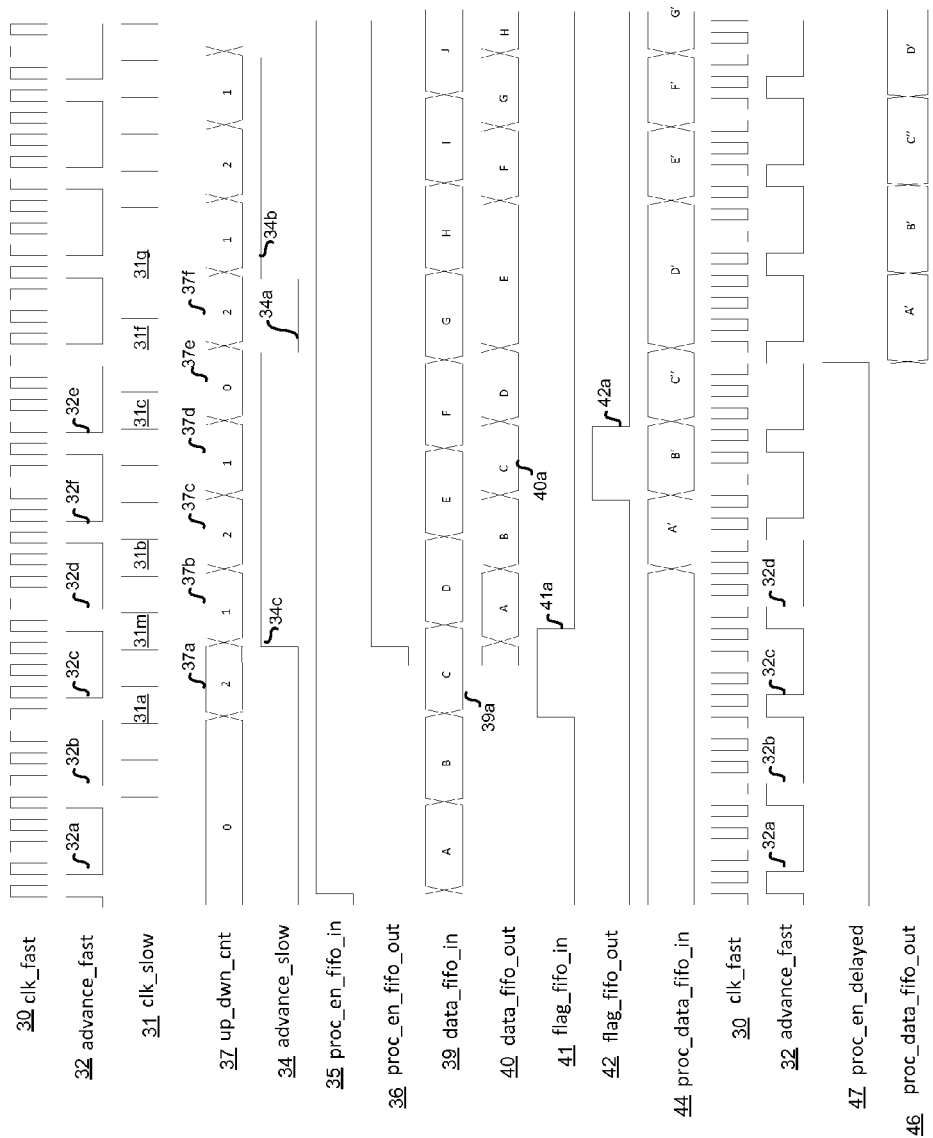
FIG. 2 is an example of a timing diagram showing an example operation of the circuitry of FIG. 1.

FIG. 2 shows an example of timing diagrams that depict operation of the example circuitry shown in FIG. 1. For example, FIG. 2 shows clk_fast 30 at 400 MHz and clk_slow 31 at 275 MHz. As shown, the two frequencies do not resolve, meaning that they are asynchronous.

Counter 17 receives advance_fast 32 from the first clock domain and generates advance_slow 34 in the second clock domain. This is described below. Proc_en_fifo_in 35 is input to buffer 19 accordance with the rising edge of advance_fast 32, and corresponding proc_en_fifo_out 36 is output from buffer 19 to the second clock domain in accordance with the rising edge of advance_slow 34. In other implementations, proc_en_fifo_in 35 is input to buffer 19 on rising edges of clk_fast when the advance_fast signal is high. In such other implementations, the timing diagram would look different than that shown in the figure.

In this example, counter 17 operates as follows. Whenever two advance_fast signals are detected, counter 17 increments to two (up_down_count 37) on the rising edge of clk_slow. In the example of FIG. 2, two advance_fast signals 32a, 32b are detected, counter 17 increments to two 37a (up_down_count) on the rising edge of clk_slow 31a. In other implementations, a value other than two may be used. Whenever up_down_count is non-zero, advance_slow 34 has a value of one, and whenever up_down_count is zero, advance_slow 34 has a value of zero.

Next, counter 17 decrements up_down_count 37 by one, to produce a value of one 37b. Next, counter decrements up_down_count by one; however, because there were two advance_fast signals 32c, 32d counted, at the same time counter increments up_down_count by two at the rising edge of clk_slow 31b, resulting in a value of two 37c. Next, counter 17 decrements up_down_count by one, to produce a value of one 37d. Next, counter 17 decrements up_down_count by one, to produce a value of zero 37e. Therefore, at this time, advance_slow goes to zero 34a. In this example, the sixth rising edge 32e of advance_fast is too close in time to clk_slow 31c for the rising edge of clk_slow 31c to trigger operation; accordingly, advance_slow goes to zero. Accordingly, as in this example, every advance_fast signal is not always picked-up by a corresponding clk_slow pulse. On the next rising edge of clk_slow 31f, up_down_count returns to two 37f, to account for the two preceding advance_slow pulses 32e, 32f. Accordingly, on the next rising edge of clk_slow 31g, advance_slow goes to a value of one 34b.

In this example, data_fifo_out 39 is output from buffer 21 to second clock domain 12 in response to receipt of, and rising edges of, advance_slow 34c and clk_slow 31m. The output data (data_fifo_out 40) is shown in FIG. 2.

In this example, a flag low (flag_fifo_in 41 in the first clock domain and flag_fifo_out 42 in the second clock domain) instructs processing circuitry 16 to perform a first type of processing and a flag high instructs processing circuitry 16 to perform a second, different type of processing. Data processed using the first type of processing is identified using a '(e.g., A') and data processed using the second type of processing is identified using a "(e.g., C")".

In this example, flag high 41a coincides with data element "C" 39a in the FIFOs and, therefore, flag_fifo_out high 42a coincides with data_fifo_out element "C" 40a. The processing performed by processing circuitry 16 generates the data proc_data_fifo_in 44, which is the input to buffer 22. Because the flag was high at data element "C", and low for all other data elements, "C" is identified as C" proc_data_fifo_in 44, whereas data elements A, B, D, E, etc. in proc_data_fifo_in 44 are identified as A', B', D', E', etc.

In FIG. 2, clk_fast 30 and advance_fast 32 are shown twice (at top and near bottom). As shown in FIG. 2, proc_data_fifo_in 44 appears at the input to buffer 22 after about four advance_fast signals (32*a*, 32*b*, 32*c*, 32*d*). Since proc_data_fifo_in 44 appears after about four cycles of advance_fast 32, the delay of delay circuit 15 is set to provide a delay that exceed four cycles of advance_fast. In this example, that delay is set to six cycles of advance_fast. Notably, the values of four and six are simply examples for this implementation; any values may be used depending on the particular circuit implementation.

In this example, data (proc_data_fifo_out 46) is read-out of buffer 22 at the rising edge of clk_fast 30 when advance_fast 32 and proc_en_delayed 47 are both high (after six cycles). This is shown at point 49 in the timing diagram. Accordingly, in this example, the output from the second clock domain 12 appears at six advance_fast pulses. That output is thus synchronous to other signals in the first clock domain, and an integer number of cycles (here, six cycles) behind an initially-received advance_fast signal at counter 17.

In an example implementation, the first and second clock domains are part of a pattern generator for automatic test equipment. In such implementations, the second clock domain may include memory to store opcodes and operands at various addresses. Processing circuitry 16 implements a sequencer, which is configured to operate at the frequency of the second clock domain and in accordance with an enable signal, to identify an address of the memory and to output, to buffer 22, an address of the memory as the output data (instead of the data from buffer 21). Buffer 22 is configured to output the address synchronously with the enable signal at a frequency of the first clock domain. Circuitry (now shown) downstream from the pattern generator use the addresses and enable signal output by the delay circuit (which are both synchronous) to access data by which to generate test signals.

The pattern generator may be part of pin electronics to generate test signals for automatic test equipment, such as that described below. In this regard, to test quantities of components, manufacturers commonly use ATE (or "testers"). ATE refers to an automated, usually computer-driven, system for testing devices, such as semiconductors, electronic circuits, and printed circuit board assemblies. A device tested by ATE is referred to as a device under test (DUT).

ATE typically includes a computer system and a testing device or a single device having corresponding functionality. ATE is capable of providing test signals to a DUT, receiving response signals from the DUT, and forwarding those response signals for processing to determine whether the DUT meets testing qualifications. In some implementations, ATE automatically generates input signals to be applied to a DUT, and monitors output signals. The ATE compares the output signals with expected responses to determine whether the DUT is defective.

Figure 3:
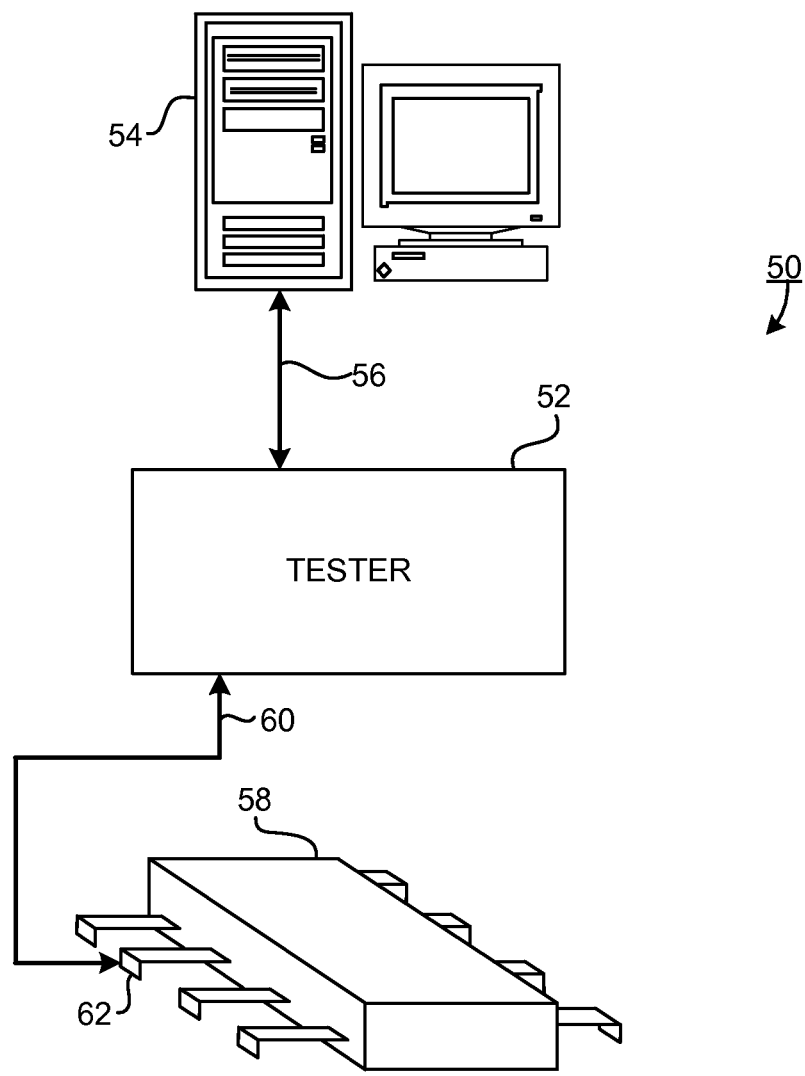
FIG. 3 is an example of an ATE test system.

Referring to FIG. 3, an example ATE system 50 for testing a DUT 58, such as a semiconductor device, includes a tester 52. To control tester 52, system 50 includes a computer system 54 that interfaces with tester 52 over a hardwire connection 56. In an example operation, computer system 54 sends commands to tester 52 to initiate execution of routines and functions for testing DUT 58. Such executing test routines may initiate the generation and transmission of test signals to the DUT 58 and collect responses from the DUT. Various types of DUTs may be tested by system 50. For example, DUTs may be semiconductor devices such as an integrated circuit (IC) chip (e.g., memory chip, microprocessor, analog-to-digital converter, digital-to-analog converter, etc.) or other devices.

To provide test signals and collect responses from the DUT, tester 52 is connected to an interface to the internal circuitry of DUT 58. For example, the DUT may be inserted into a socket in the tester, which contains interfaces to electrical connections between the DUT and the tester. A conductor 60 (e.g., one or more conductive pathways) is connected to the interface and is used to deliver test signals (e.g., switching or DC test signals, etc.) to the internal circuitry of DUT 58. Conductor 60 also senses signals in response to the test signals provided by tester 52. For example, a voltage signal or a current signal may be sensed at pin 62 in response to a test signal and sent over conductor 60 to tester 52 for analysis. Such single port tests may also be performed on other pins included in DUT 58. For example, tester 52 may provide test signals to other pins and collect associated signals reflected back over conductors (that deliver the provided signals). By collecting the reflected signals, the input impedance of the pins may be characterized along with other single port testing quantities. In other test scenarios, a digital signal may be sent over conductor 60 to pin 62 for storing a digital value on DUT 58. Once stored, DUT 58 may be accessed to retrieve and send the stored digital value over conductor 60 to tester 52. The retrieved digital value may then be identified to determine if the proper value was stored on DUT 58.

Along with performing single port measurements, a two-port or multi-port test may also be performed by tester 52. For example, a test signal may be injected over conductor 60 into pin 62 and a response signal may be collected from one or more other pins of DUT 58. This response signal may be provided to tester 52 to determine quantities, such as gain response, phase response, and other throughput measurement quantities.

Figure 4:
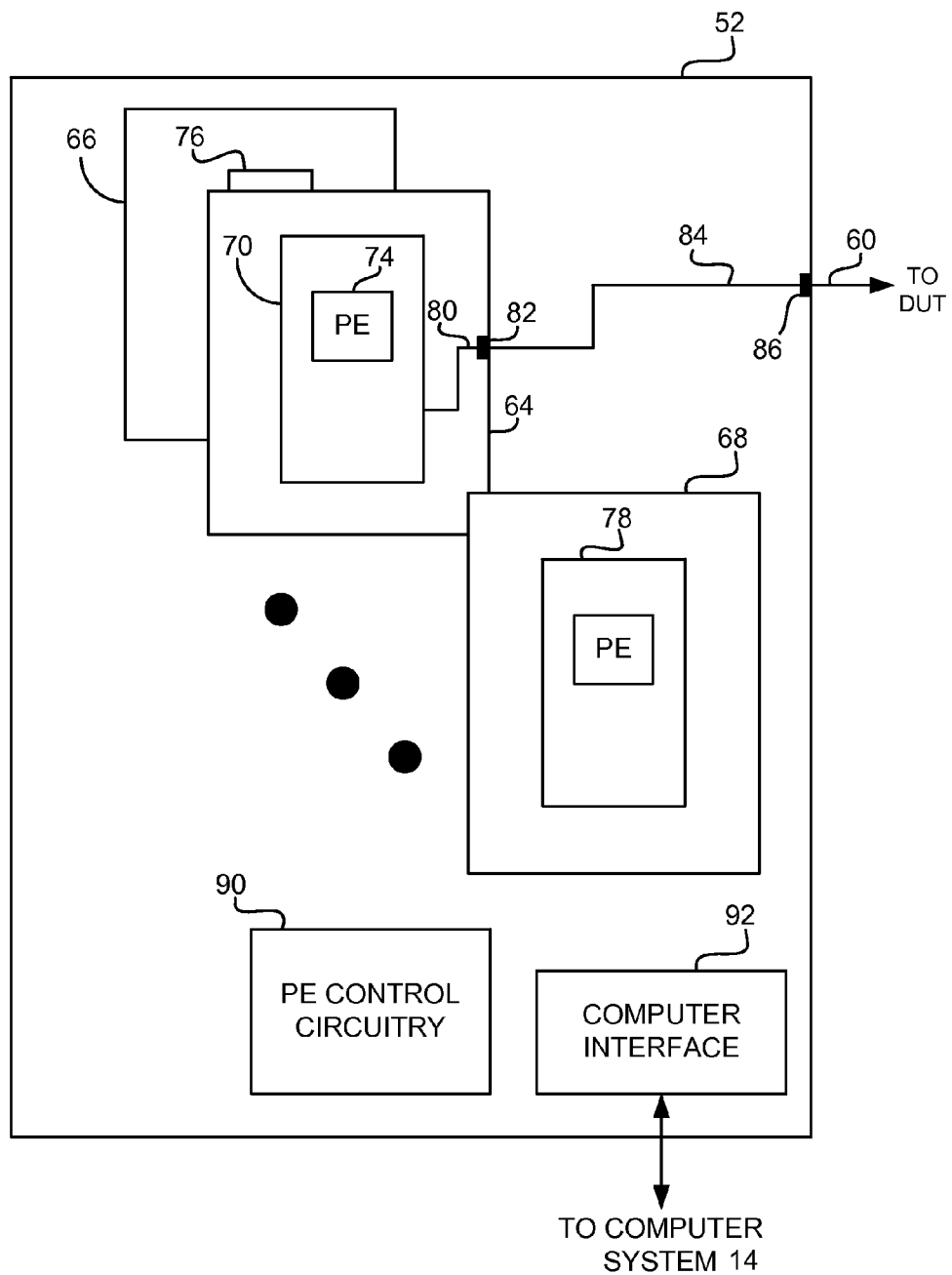
FIG. 4 is an example of circuitry included in the ATE.

Referring also to FIG. 4, to send and collect test signals from multiple connector pins of a DUT (or multiple DUTs), tester 52 includes an interface card 64 that can communicate with numerous pins. For example, interface card 64 may transmit test signals to, e.g., 32, 64, or 528 pins and collect corresponding responses. Each communication link to a pin is typically referred to as a channel and, by providing test signals to a number of channels, testing time is reduced since multiple tests may be performed simultaneously. Along with having many channels on an interface card, by including multiple interface cards in tester 52, the overall number of channels increases, thereby further reducing testing time. In this example, two additional interface cards 66 and 68 are shown to demonstrate that multiple interface cards may populate tester 52.

Each interface card includes one or more dedicated integrated circuit (IC) chips (e.g., an application specific integrated circuit (ASIC)) for performing particular test functions. For example, interface card 64 includes IC chip 70 for performing pin electronics (PE) tests. Specifically, IC chip 70 has a PE stage 74 that includes circuitry for performing PE tests. Additionally, interface cards 66 and 68 respectively include IC chips 76 and 78 that include PE circuitry. Typically, PE testing involves sending switching test signals, or digital waveforms, to a DUT (e.g., DUT 58) and collecting responses to further characterize the performance of the DUT. For example, IC chip 70 may transmit (to the DUT) switching test signals that represent a vector of binary values for storage on the DUT. Once these binary values have been stored, the DUT may be accessed by tester 52 to determine if the correct binary values have been stored. Since digital signals typically include abrupt voltage transitions, the circuitry in PE stage 74 on IC chip 70 operates at a relatively high speed in comparison to the other test circuitry (e.g., parametric measurement unit (PMU) circuitry, which is not shown in the figures). PE testing may also involve adding jitter to test signals and observing DUT operation in the presence of the jitter.

In this example implementation, to pass test signals from interface card 64 to DUT 58, one or more conducting traces 80 connect IC chip 70 to an interface board connector 82 that allows signals to be passed on and off interface board 64. Interface board connector 82 is also connected to one or more conductors 84 that are connected to an interface connector 86, which allow signals to be passed to and from tester 52. In this example, conductor(s) 60 are connected to interface connector 86 for bi-directional signal passage between tester 52 and pins of DUT 58. In some implementations, an interface device may be used to connect one or more conductors from tester 52 to the DUT. For example, the DUT (e.g., DUT 58) may be mounted onto a device interface board (DIB) for providing access to each DUT pin. In such an arrangement, conductor(s) 60 may be connected to the DIB for placing test signals on the appropriate pin(s) (e.g., pin 62) of the DUT.

In some implementations, conducting trace(s) 80 and conductor(s) 84 respectively connect IC chip 70 and interface board 64 for delivering and collecting signals. IC chip 70 (along with IC chips 76 and 78) may have multiple pins (e.g., eight, sixteen, etc.) that are respectively connected with multiple conducting traces and corresponding conductors for providing and collecting signals from the DUT (e.g., via a DIB). Additionally, in some implementations, tester 52 may connect to two or more DIB's for interfacing the channels provided by interface cards 64, 66, and 68 to one or multiple devices under test.

To initiate and control the testing performed by interface cards 64, 66, and 68, tester 52, PE control circuitry 90 provides test parameters (e.g., test signal voltage level, test signal current level, digital values, etc.) for producing test signals and analyzing DUT responses. The PE control circuitry may be implemented using one or more processing devices. Examples of processing devices include, but are not limited to, a microprocessor, a microcontroller, programmable logic (e.g., a field-programmable gate array), and/or combination(s) thereof. Tester 52 also includes a computer interface 92 that allows computer system 54 to control the operations executed by tester 52 and also allows data (e.g., test parameters, DUT responses, etc.) to pass between tester 52 and computer system 54.

While this specification describes example implementations related to "testing" and a "test system," the devices and method described herein may be used in any appropriate system, and are not limited to test systems or to the example test systems described herein.

Testing performed as described herein may be implemented using hardware or a combination of hardware and software. For example, a test system like the ones described herein may include various controllers and/or processing devices located at various points. A central computer may coordinate operation among the various controllers or processing devices. The central computer, controllers, and processing devices may execute various software routines to effect control and coordination of testing and calibration.

Testing can be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the testing and calibration can be performed by one or more programmable processors executing one or more computer programs to perform the functions described herein. All or part of the testing and calibration can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any "electrical connection" as used herein may imply a direct physical connection or a connection that includes intervening components but that nevertheless allows electrical signals to flow between connected components. Any "connection" involving electrical circuitry mentioned herein, unless stated otherwise, is an electrical connection and not necessarily a direct physical connection regardless of whether the word "electrical" is used to modify "connection".

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. An apparatus comprising:
   first circuitry configured to operate at a first frequency;
   second circuitry configured to operate at a second frequency that is different from the first frequency, the second circuitry for receiving input from, and for providing output to, the first circuitry;
   logic that bridges the first circuitry and the second circuitry, the logic to enable the second circuitry to appear to run an integer number of cycles of the first frequency, the logic for receiving first signals at the first frequency and for generating second signals at the second frequency, the second signals for triggering operations performed by the second circuitry; and
   a buffer circuit bridging the first circuitry and the second circuitry, the buffer circuit comprising a first-in first-out circuit comprising an input terminal to receive data from the second circuitry in accordance with a second signal output by the logic and the second frequency and an output terminal to output the data in accordance with a first signal and the first frequency.

2. The apparatus of claim 1, wherein the logic comprises a counter, the counter comprising:
an up-counter circuit to count a number of the first signals;
a pulse generator circuit to generate a pulse in response to reaching the number of the first signals, the pulse having a width that exceeds a period of the second frequency; and
an up-down-counter circuit to receive the pulse, to increment a count by the number, and to down-count from the number until reaching zero, the down-counter outputting a second signal when the count is non-zero.

3. The apparatus of claim 1, wherein the buffer circuit is configured to output the data synchronously with the first frequency and an integer number of cycles behind an initially-received first signal at the logic.

4. The apparatus of claim 1, wherein the second circuitry comprises:
memory to store opcodes and operands at various addresses; and
a processing device that is configured to operate at the second frequency and in accordance with an enable signal to identify an address of the memory and to output, to the buffer circuit, an address of the memory as the data;
wherein the buffer circuit is configured to output the address synchronously with the enable signal at the first frequency.

5. The apparatus of claim 4, wherein the first circuitry comprises:
a delay element to receive the enable signal, to delay the enable signal a number of clock cycles, and to output the enable signal delayed to the buffer circuit.

6. The apparatus of claim 4, wherein the processing device comprises a sequencer for a pattern generator.

7. The apparatus of claim 1, wherein the second circuitry comprises:
a processing device that is configured to operate at the second frequency and in accordance with an enable signal to output the data to the buffer circuit;
wherein the buffer circuit is configured to output the address synchronously with the enable signal at the first frequency.

8. The apparatus of claim 7, wherein the buffer circuit is a first buffer circuit and wherein the apparatus further comprises:
a second buffer circuit bridging the first circuitry and the second circuitry, the second buffer circuit comprising a first-in first-out circuit comprising an input terminal to receive data from the first circuitry at the first frequency and an output terminal to output the data to the processing device in accordance with a second signal output by the logic and the second frequency.

9. The apparatus of claim 8, wherein the first circuitry comprises:
a delay element to receive the enable signal, to delay the enable signal a number of clock cycles, and to output the enable signal delayed to the first buffer circuit.

10. The apparatus of claim 8, further comprising:
a third buffer circuit bridging the first circuitry and the third circuitry, the third buffer circuit comprising a first-in first-out circuit comprising an input terminal to receive the enable signal from the first circuitry at the first frequency and an output terminal to output the enable signal to the third circuitry in accordance with a second signal output by the logic and the second frequency.

11. The apparatus of claim 10, further comprising:
a fourth buffer circuit bridging the first circuitry and the second circuitry, the fourth buffer circuit comprising a first-in first-out circuit comprising an input terminal to receive a flag signal from the first circuitry at the first frequency and an output terminal to output the flag signal to the second circuitry in accordance with a second signal output by the logic and the second frequency.

12. The apparatus of claim 7, wherein the processing device comprises a sequencer for a pattern generator.

13. The apparatus of claim 1, wherein the first frequency is greater than the second frequency.

14. The apparatus of claim 1, wherein the second frequency is greater than the first frequency.

15. The apparatus of claim 1, wherein the first frequency and the second circuitry are asynchronous.

16. The apparatus of claim 1, wherein the first circuitry and the second circuitry together comprise automatic test equipment; and
wherein the second circuitry comprises a pattern generator for use in the automatic test equipment.

17. A method comprising:
operating first circuitry at a first frequency;
operating second circuitry at a second frequency that is different from the first frequency, the second circuitry for receiving input from, and for providing output to, the first circuitry;
using logic, which bridges the first circuitry and the second circuitry, to enable the second circuitry to appear to run an integer number of cycles of the first frequency, the logic for receiving first signals at the first frequency and for generating second signals at the second frequency, the second signals for triggering operations performed by the second circuitry; and
using a buffer circuit, which bridges the first circuitry and the second circuitry, to receive data from the second circuitry in accordance with a second signal output by the logic and the second frequency and to output the data in accordance with a first signal and the first frequency.

18. The method of claim 17, wherein the logic comprises a counter, the counter comprising:
an up-counter circuit to count a number of the first signals;
a pulse generator circuit to generate a pulse in response to reaching the number of the first signals, the pulse having a width that exceeds a period of the second frequency; and
an up-down-counter circuit to receive the pulse, to increment a count by the number, and to down-count from the number until reaching zero, the down-counter outputting a second signal when the count is non-zero.

19. The method of claim 17, wherein the buffer circuit outputs the data synchronously with the first frequency and an integer number of cycles behind an initially-received first signal at the logic.

20. The method of claim 17, wherein the second circuitry comprises:
memory to store opcodes and operands at various addresses; and
a processing device that operates at the second frequency and in accordance with an enable signal to identify an address of the memory and that outputs, to the buffer circuit, an address of the memory as the data;
wherein the buffer circuit outputs the address synchronously with the enable signal at the first frequency.

21. The method of claim 20, wherein the first circuitry comprises:
a delay element receiving the enable signal, delaying the enable signal a number of clock cycles, and outputting the enable signal delayed to the buffer circuit.

22. The method of claim 20, wherein the processing device comprises a sequencer for a pattern generator.

23. The method of claim 17, wherein the second circuitry comprises:
a processing device that operates at the second frequency and in accordance with an enable signal to output the data to the buffer circuit;
wherein the buffer circuit outputs the address synchronously with the enable signal at the first frequency.

24. The method of claim 23, wherein the buffer circuit is a first buffer circuit and wherein the method further comprises:
a second buffer circuit bridging the first circuitry and the second circuitry, the second buffer circuit comprising a first-in first-out circuit comprising an input terminal to receive data from the first circuitry at the first frequency and an output terminal to output the data to the processing device in accordance with a second signal output by the logic and the second frequency.

25. The method of claim 24, wherein the first circuitry comprises:
a delay element receiving the enable signal, delaying the enable signal a number of clock cycles, and outputting the enable signal delayed to the first buffer circuit.

26. The method of claim 24, further comprising:
a third buffer circuit bridging the first circuitry and the third circuitry, the third buffer circuit comprising a first-in first-out circuit comprising an input terminal to receive the enable signal from the first circuitry at the first frequency and an output terminal to output the enable signal to the third circuitry in accordance with a second signal output by the logic and the second frequency.

27. The method of claim 26, further comprising:
a fourth buffer circuit bridging the first circuitry and the second circuitry, the fourth buffer circuit comprising a first-in first-out circuit comprising an input terminal to receive a flag signal from the first circuitry at the first frequency and an output terminal to output the flag signal to the second circuitry in accordance with a second signal output by the logic and the second frequency.

28. The method of claim 23, wherein the processing device comprises a sequencer for a pattern generator.

29. The method of claim 17, wherein the first frequency is greater than the second frequency.

30. The method of claim 17, wherein the second frequency is greater than the first frequency.

31. The method of claim 17, wherein the first frequency and the second circuitry are asynchronous.

32. The method of claim 17, wherein the first circuitry and the second circuitry together comprise automatic test equipment; and
wherein the second circuitry comprises a pattern generator for use in the automatic test equipment.

* * * * *